United States Patent
Wakamatsu

(10) Patent No.: US 9,374,531 B2
(45) Date of Patent: Jun. 21, 2016

(54) IMAGE SHAKE CORRECTING APPARATUS AND CONTROL METHOD FOR SAME, LENS BARREL, OPTICAL APPARATUS, AND IMAGING APPARATUS

(71) Applicant: CANON KABUSHIKI KAISHA, Tokyo (JP)

(72) Inventor: Nobushige Wakamatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/337,288

(22) Filed: Jul. 22, 2014

(65) Prior Publication Data
US 2015/0036007 A1 Feb. 5, 2015

(30) Foreign Application Priority Data
Aug. 1, 2013 (JP) .................................. 2013-160279

(51) Int. Cl.
*H04N 5/232* (2006.01)

(52) U.S. Cl.
CPC ....... *H04N 5/23267* (2013.01); *H04N 5/23258* (2013.01); *H04N 5/23277* (2013.01)

(58) Field of Classification Search
CPC ..... G02B 27/646; G03B 5/00; H04N 5/23287
See application file for complete search history.

(56) References Cited

U.S. PATENT DOCUMENTS 5,617,176 A * 4/1997 Matsuzawa et al. ............ 396/55
5,649,237 A 7/1997 Okazaki
8,159,545 B2 4/2012 Washisu et al.
8,305,455 B2 11/2012 Washisu et al.
8,896,716 B2 * 11/2014 Miyasako ............ G02B 27/646
348/208.1
2007/0166021 A1 * 7/2007 Yamazaki ....................... 396/55

FOREIGN PATENT DOCUMENTS

JP H05-323436 A 12/1993
JP H07-225405 A 8/1995
(Continued)

OTHER PUBLICATIONS

U.S. Appl. No. 14/339,745, filed Jul. 24, 2014, Nobushige Wakamatsu.
(Continued)

*Primary Examiner* — Clayton E Laballe
*Assistant Examiner* — Noam Reisner
(74) *Attorney, Agent, or Firm* — Fitzpatrick, Cella, Harper & Scinto

(57) ABSTRACT

An image shake correcting apparatus includes a calculating unit that calculates an image shake correction amount by acquiring a shake detection signal output from a shake detecting unit. A shake correcting unit corrects an image shake in accordance with the calculated image shake correction amount. An offset removing unit removes an offset component from the shake detection signal. A reference value calculating unit calculates an offset reference value from the shake detection signal. The calculating unit causes the offset removing unit to remove an offset component from the shake detection signal to thereby calculate the image shake correction amount from a start of an operation of the shake detecting unit until the reference value calculating unit calculates the offset reference value, and the calculating unit calculates the image shake correction amount from a signal obtained by subtracting the offset reference value from the shake detection signal.

11 Claims, 9 Drawing Sheets

(56) References Cited

FOREIGN PATENT DOCUMENTS

| | | |
|---|---|---|
| JP | H10-010596 A | 1/1998 |
| JP | 2010-025962 A | 2/2010 |

OTHER PUBLICATIONS

U.S. Appl. No. 14/341,947, filed Jul. 28, 2014, Nobushige Wakamatsu.

* cited by examiner

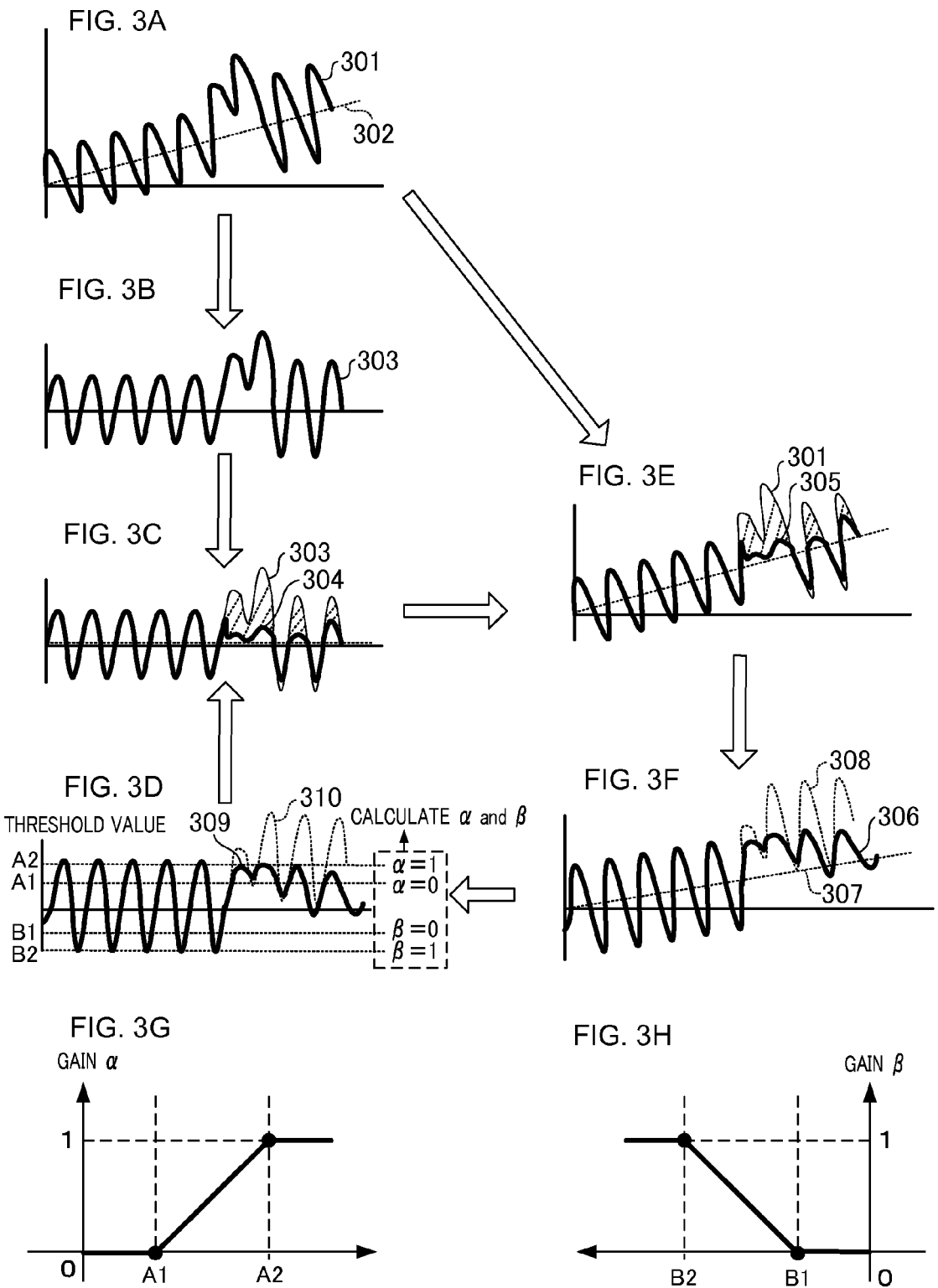

FIG. 4A
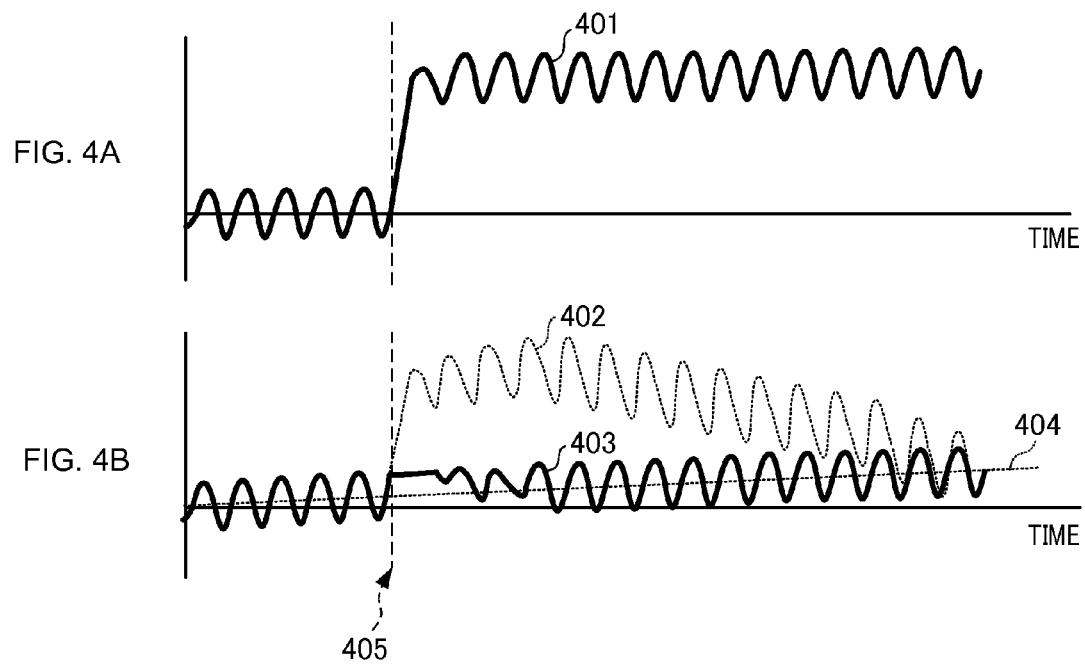
FIG. 4B
FIG. 5
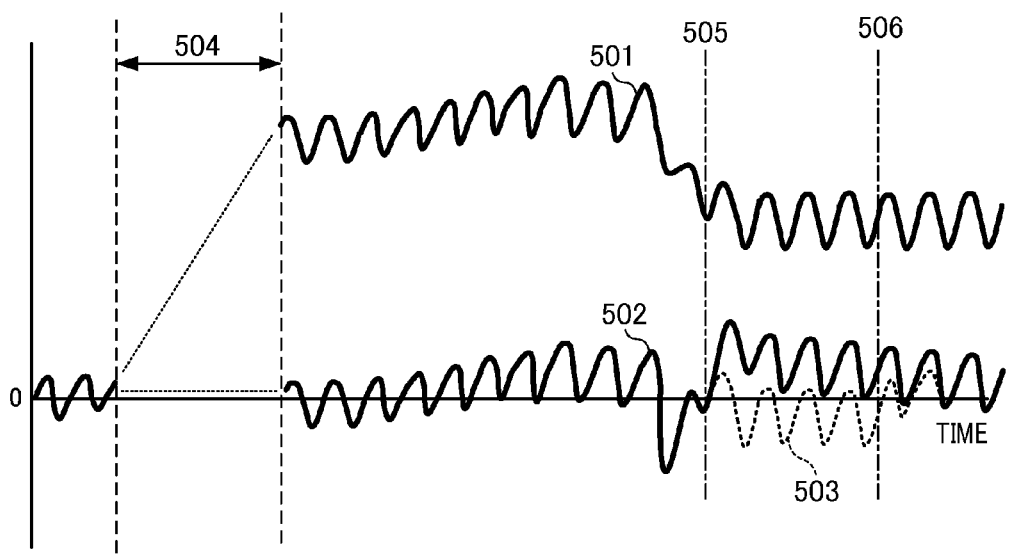

IMAGE SHAKE CORRECTING APPARATUS AND CONTROL METHOD FOR SAME, LENS BARREL, OPTICAL APPARATUS, AND IMAGING APPARATUS

CLAIM OF PRIORITY

This applications claims the benefit of Japanese Patent Application No. 2013-160279, filed on Aug. 1, 2013, which is hereby incorporated by reference herein in its entirety.

BACKGROUND OF THE INVENTION

1. Field of the Invention

The present invention relates to an image shake correction technique for correcting an image shake caused by shake, such as hand shake. In particular, the present invention relates to a technique for smoothly correcting the low frequency component of a shake while ensuring stable performance immediately after the power is turned on.

2. Description of the Related Art

In cameras having an image shake correcting apparatus for preventing image shake caused by hand shake, or the like, mounted therein, shooting can be performed without image shake even when hand shake occurs upon shutter release. An angle shake of a camera caused by hand shake, or the like, is detected and, then, an image shake correction lens (hereafter referred to as a "correction lens") is driven, depending on a detection value. At this time, camera vibration needs to be correctly detected so as to correct an optical axis change caused by shake. In principle, a vibration detecting unit configured to obtain the results of detection, such as an angular velocity and a drive control unit configured to displace a correction lens based on the results of calculation processing are mounted in a camera so as to suppress image shake.

The output signal of a sensor for detecting camera vibration includes a direct current component, such as variations in reference voltage due to individual differences in sensors and drifts in accordance with a change in temperature. If the sensor output includes low frequency component noise, such low frequency component noise may lead to deterioration in correction precision. Thus, in order to remove an offset component, a low frequency component is typically removed from the output signal of a sensor using an HPF (high-pass filter) so as to obtain an image shake correction signal.

When a user performs an operation, such as panning or tilting, for moving an imaging apparatus in one direction for a relatively long period of time, the output signal of a sensor includes a large amount of low frequency components, and thus, low frequency components need to be attenuated upon image shake correction. There has been known a control for determining whether panning or tilting is being performed, based on data of angular velocity and data of an angle obtained by integration of angular velocity so as to perform switching to a correction characteristic suitable for panning or tilting. Control is made such that image shake correction does not respond to a low frequency by transitioning the cut-off frequency of an HPF or an integrating filter to a higher frequency side. Japanese Patent Laid-Open No. H5-323436 discloses image shake correction control in the panning state or the tilting state, which is capable of performing image shake correction for high frequencies, while suppressing the response at low frequencies. Japanese Patent Laid-Open No. H10-010596 discloses anti-shake control by fixing an offset during imaging without performing HPF processing during imaging (exposure).

In the conventional configuration for attenuating a low frequency component using an HPF for removing an offset component, the following phenomenon occurs. If the output of an angular velocity sensor includes a low frequency noise component upon image shake correction based on the output of the angular velocity sensor, unsuitable correction is made to actual camera shake. In addition, image shake correction may be adversely affected by a filter characteristic including a secondary HPF due to panning, or the like. The low frequency component of large amplitude is attenuated by the occurrence of vibration caused by panning, or the like, and a signal in a direction reverse to the panning direction is generated, for example, upon completion of panning (a so-called "swing-back phenomenon"). The signal is then slowly converged to zero. However, if image shake correction is performed based on the signal, the correction amount is calculated by a signal that is different from the actual shake of an imaging apparatus, which may lead to deterioration in correction precision.

If the cut-off frequency of the HPF is set to low in the filter configuration, including the HPF, the performance of image shake correction for low frequency components associated with vibration, or the like, of the photographer's body can be improved. In this case, the magnitude of a swing-back signal becomes large, and the time to be taken until the signal is converged to zero becomes longer after the occurrence of large vibration caused by panning, or the like. Thus, an appropriate image shake correction effect may be obtained only when the photographer captures an image with his camera firmly held by his hands, so as not to excite shake of the imaging apparatus.

In the technique disclosed in Japanese Patent Laid-Open No. H10-010596, correction is performed in a state different from the actual hand shake when an angular velocity offset is fixed immediately prior to imaging, and an error occurs in the fixed angular velocity offset. In other words, when an offset error occurs in angular velocity, immediately prior to imaging, image shake correction is executed in a state when the angular velocity of the offset error is continuously added to a hand shake component signal during imaging. Hence, image shake correction is performed in an unintended direction, resulting in a reduction in correction effect.

Thus, it is preferable that no HPF is provided in order to improve an image shake correction effect in a low frequency range. However, in this case, since there exist individual differences among sensors for angular velocity detection, it is contemplated that a temperature drift, in which its direct current component changes due to variations in reference voltage, or the like, may adversely have an affect thereon. If a large angular velocity offset occurs when the power is turned on, a long time is required until the filter becomes stable. Degradation in the image shake correction performance is concerned for a long time, immediately after the power to the sensor is turned on. Thus, a target value needs to be calculated by subtracting an offset value from the output of the sensor when the power is turned on, but it is difficult to instantly calculate an offset value for the sensor immediately after the power is turned on.

SUMMARY OF THE INVENTION

The present invention provides a technique for realizing image shake correction in a wide frequency band, while ensuring a stable image shake correction performance immediately after a start of shake detection.

According to one aspect, the present invention provides an image shake correcting apparatus that includes a shake detecting unit configured to detect shake of an apparatus, a calculating unit configured to calculate an image shake correction amount by acquiring a shake detection signal output from the shake detecting unit, and a shake correcting unit configured to correct an image shake in accordance with the image shake correction amount calculated by the calculating unit. The calculating unit further includes an offset removing unit configured to remove an offset component from the shake detection signal, and a reference value calculating unit configured to calculate an offset reference value by acquiring the shake detection signal, and wherein the calculating unit causes the offset removing unit to remove an offset component from the shake detection signal to thereby calculate the image shake correction amount during the time period until the reference value calculating unit calculates an offset reference value regarding the shake detection signal after a start of the operation of the shake detecting unit, and the calculating unit calculates the image shake correction amount from a signal obtained by subtracting the offset reference value from the shake detection signal after the reference value calculating unit calculates the offset reference value.

According to the present invention, a technique for realizing image shake correction in a wide frequency band, while ensuring a stable image shake correction performance immediately after a start of shake detection, may be provided.

Further features of the present invention will become apparent from the following description of exemplary embodiments with reference to the attached drawings.

BRIEF DESCRIPTION OF THE DRAWINGS

FIGS. 3A to 3H are explanatory diagrams illustrating a subtraction amount calculating unit according to the first embodiment of the present invention.

FIGS. 4A and 4B are explanatory diagrams illustrating shake correction amount calculation processing according to the first embodiment of the present invention.

FIG. 5 is an explanatory diagram illustrating shake correction amount calculation processing during imaging, and at the period other than the imaging period, according to the first embodiment of the present invention.

DESCRIPTION OF THE EMBODIMENTS

Hereafter, preferred embodiments of the present invention will be described with reference to the drawings. The present invention is applicable to, for example, an interchangeable lens attached to a digital single lens reflex camera, optical equipment such as a lens barrel, an imaging apparatus such as a digital video camera, a monitoring camera, a Web camera, or the like, and electronic equipment including an imaging apparatus, such as a mobile phone, a tablet terminal, or the like.

First, a description will be given of an angle calculating filter (included in an angle calculating unit to be described below) for use in an image shake correcting apparatus. An angle calculating filter for use in image shake correction based on the output of an angular velocity sensor is a filter that combines an integrator and an HPF, as shown on the left side of the following formula (1). As shown on the right side of the following formula (1), this is the same as the Formula obtained by multiplying the low-pass filter (LPF) with a time constant T by the time constant T.

$$\frac{1}{s} \times \frac{Ts}{Ts+1} = \frac{T}{Ts+1} \quad (1)$$

The symbol T on the left side of Formula (1) represents a time constant of the HPF, and the symbol T on the right side of Formula (1) represents a time constant of the LPF.

When the output of the angular velocity sensor includes a low frequency noise component, correction that is different from the actual camera shake is performed, resulting in induction in shake conversely. In order to prevent the calculation result of an angle signal from being saturated upon integral calculation, a filter with a characteristic shown on the right side of Formula (1) is used. The angle calculating filter includes an HPF. Hence, if another HPF is connected to a previous stage of the angle calculating filter, a filter from the output of the angular velocity sensor to angle calculation is constituted by a secondary HPF. Thus, a phase advances largely in the low frequency band of hand shake, resulting in a reduction in correction effect. Hereafter, a description will be given of a configuration for performing highly-accurate shake correction in a wide frequency band during imaging in sequence in accordance with embodiments of the present invention.

First Embodiment

Figure 1:
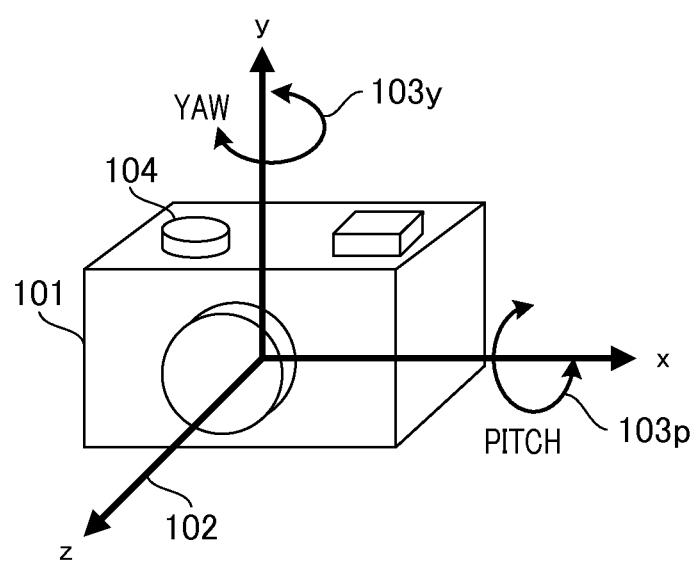
FIG. 1 is an explanatory diagram illustrating shake directions relating to image shake correction according to the present invention.
Figure 2:
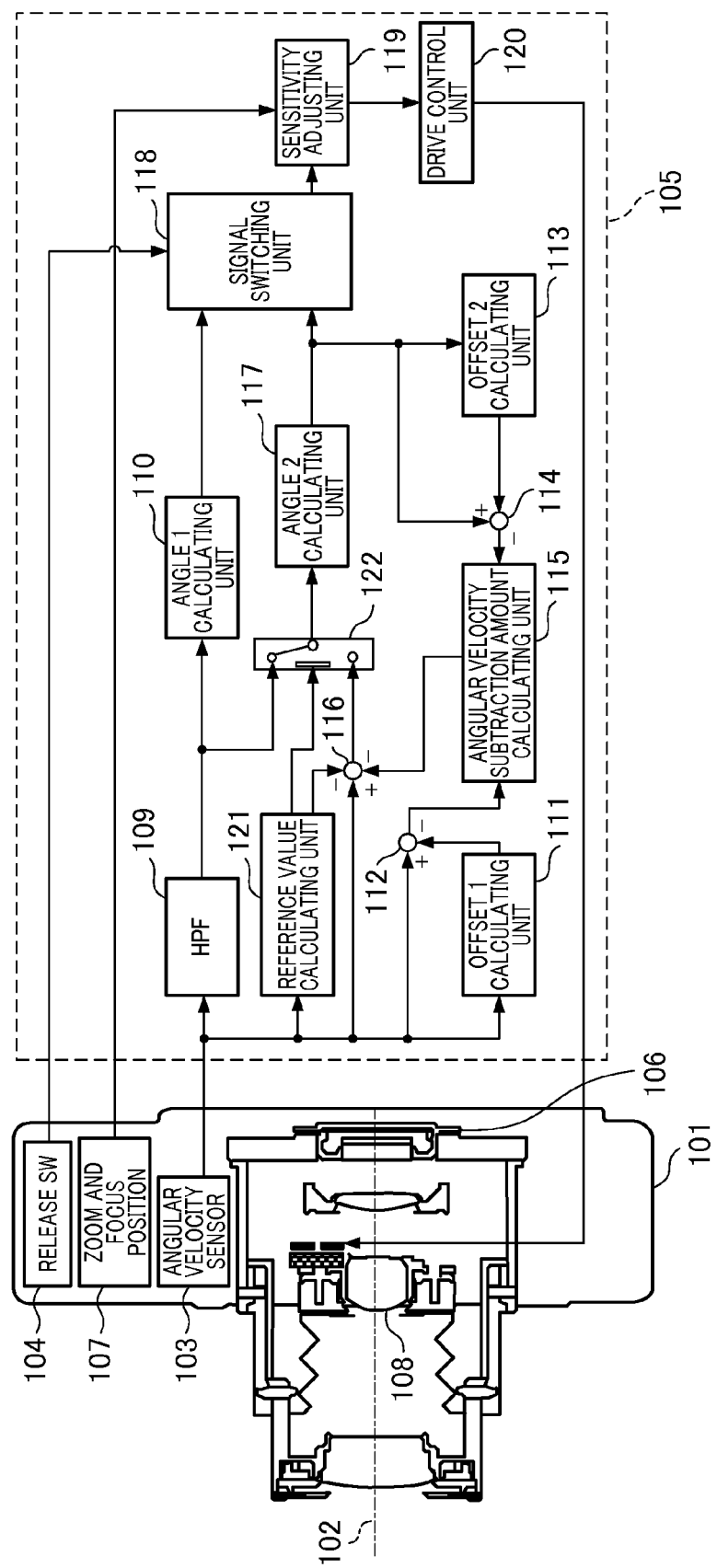
FIG. 2 is a top view and a control block diagram illustrating an imaging apparatus according to a first embodiment of the present invention.

FIG. 1 is a schematic perspective view illustrating an imaging apparatus including the image shake correcting apparatus according to the first embodiment of the present invention. FIG. 2 illustrates a configuration of an imaging unit of an imaging apparatus and a functional block diagram of image shake correction processing executed by a CPU (Central Processing Unit) 105.

The body of a camera 101 includes a release button. The open/close signal of a switch (release SW) 104 by the operation of the release button is sent to the CPU 105 of the camera 101. The correction lens of a shake correcting unit 108 and an imaging element 106 are located on the optical axis 102 (the z-axis in FIG. 1) of an imaging optical system. An angular velocity sensor 103 is a shake detecting unit that detects angle shake in the pitch direction indicated by arrow 103$p$ and the yaw direction indicated by arrow 103$y$ so as to output a shake detection signal. In FIG. 1, the x-axis indicates the first axis (pitch rotation axis) orthogonal to the z-axis, and the y-axis indicates the second axis (yaw rotation axis) orthogonal to the z-axis and the x-axis.

A shake detection signal (angular velocity detection signal) output from the angular velocity sensor 103 is input to the CPU 105. An HPF (high-pass filter) 109 cuts off the DC (direct current) component of the output of the angular velocity sensor 103 so as to remove an offset component to be added as detection noise. An angular velocity signal passed through the HPF is integrated by a first angle calculating unit (hereafter referred to as "angle 1 calculating unit") 110 so as to be converted into an angle signal. The CPU 105 determines a panning or a tilting operation depending on the magnitude of the angular velocity. Setting is made such that image shake correction does not respond to a low frequency by shifting the cut-off frequency of the HPF 109 to a higher frequency side during a panning or a tilting operation. Hereafter, a description will be given of image shake correction processing by taking an example of a panning operation, but the same processing is also performed for a tilting operation.

In the present embodiment, angle calculation performed by a first calculating unit including the angle 1 calculating unit 110 is executed in parallel with an angle calculation performed by a second calculating unit, including a second angle calculating unit (hereafter referred to as "angle 2 calculating unit") 117. Image shake is suppressed based on the output of the angle 1 calculating unit 110 prior to imaging (exposure), whereas image shake correction control is made based on the output of the angle 2 calculating unit 117 during imaging (exposure).

The output of the angular velocity sensor 103 is also input to a subtracting unit 116. The subtracting unit 116 subtracts the output value of an angular velocity subtraction amount calculating unit (hereafter referred to as a "subtraction amount calculating unit") 115 and the output value of the reference value calculating unit 121 from the output of the angular velocity sensor 103. The output of the subtracting unit 116 is input to the signal selecting unit 122. The output of the HPF 109 is also input to the signal selecting unit 122. The signal selecting unit 122 selects the signal of the output of the HPF 109 or the signal of the output of the subtracting unit 116 based on the determination signal from the reference value calculating unit 121 and then outputs the selected signal. The output selected by the signal selecting unit 122 is input to the angle 2 calculating unit 117, and the angle 2 calculating unit 117 converts the output into an angle signal. Calculation performed by the subtraction amount calculating unit 115, the reference value calculating unit 121, and the signal selecting unit 122 will be described in detail below.

The first angle (hereafter referred to as "angle 1") calculated by the angle 1 calculating unit 110 and the second angle (hereafter referred to as "angle 2") calculated by the angle 2 calculating unit 117 are input to a signal switching unit 118. The signal switching unit 118 selects the first image shake correction amount based on the angle 1 or the second image shake correction amount based on the angle 2 so as to perform image shake correction. The output of the release SW 104 is input to the signal switching unit 118. It is determined whether or not the imaging operation has started, based on the open/close signal of the release SW 104, and the signal switching unit 118 selects operation as to whether image shake correction is performed by using the angle 1 or image shake correction is performed by using the angle 2. The angle signal selected by the signal switching unit 118 is input to a sensitivity adjusting unit 119. The sensitivity adjusting unit 119 amplifies an angle signal, which is the output of the signal switching unit 118, based on positional information 107 about a zoom lens and a focus lens, and a focal distance and a shooting magnification determined thereby so as to calculate a target value for image shake correction. The target value is used for correcting the change in shake correction sensitivity on an imaging plane with respect to the shake correction stroke of the shake correcting unit 108 due to the change in optical information about a focus lens, a zoom lens, and the like. Note that the positional information 107 about a zoom lens and a focus lens is acquired from a known position detecting unit that is disposed within a lens barrel.

The target value for image shake correction calculated by the sensitivity adjusting unit 119 is input to a drive control unit 120, and then the shake correcting unit 108, including a correction lens, is driven, so that image shake correction is performed. The shake correcting unit 108 includes an actuator and a drive mechanism unit for driving the correction lens. In the example shown in FIG. 2, so-called "optical anti-vibration," in which the correction lens serving as a shake correcting unit is moved within a plane perpendicular to the optical axis based on the calculated image shake correction amount, is employed as the image shake correcting method. The image shake correcting method is not limited thereto, but may also be performed by moving an imaging element within a plane perpendicular to the optical axis. An electronic anti-vibration method for mitigating the effects of hand shake, or the like, by changing the image segmenting position of each of captured frames output from the imaging element may further be employed as the image shake correcting method. Image shake correction may also be performed by combining a plurality of methods, such that shake correction is performed by electronic anti-vibration prior to still image shooting, and shake correction is performed by optical anti-vibration during still image shooting.

Next, a description will be given of angular velocity subtraction amount calculation processing. A first offset calculating unit (hereafter referred to as "offset 1 calculating unit") 111 calculates an angular velocity offset component that is included in the output of the angular velocity sensor 103 as detection noise. The first offset, which is the angular velocity offset component, is denoted as "offset 1". For example, the output value of the angular velocity sensor 103 when a hand shake vibration applied to an imaging apparatus is very small, such as when the amplitude of the angular velocity passed through the HPF is small, when the amplitude of angular acceleration obtained by differentiating the angular velocity is small, and the like, is acquired. These output values are smoothly connected by an LPF, of which the cut-off frequency is set to very low, so that the offset 1 is calculated as a DC component.

A second offset calculating unit (hereafter referred to as "offset 2 calculating unit") 113 calculates an angle offset component from the output of the angle 2 calculating unit 117. The second offset, which is the angle offset component, is denoted as "offset 2". In this case, the output of the angle 2 calculating unit 117 is a sampling value (hereafter referred to as "previous sampling value") obtained in the past point in time by a control cycle from the present point in time. For example, the sampling value is passed through an LPF, of which the cut-off frequency is set to very low, and LPF calculation is stopped during the panning operation, so that the offset 2 is calculated while preventing offset incorrect calculation during the panning operation. Panning determination processing is performed based on the output of the angular velocity sensor 103. The CPU 105 determines that the panning operation is being performed if an angular velocity having a predetermined amplitude or greater is output for a time over a predetermined time.

The offset 1 (angular velocity offset) and the offset 2 (angle offset) are calculated as described above. A signal obtained by subtracting the offset 1 from the output of the angular velocity sensor 103 and a signal obtained by subtracting the offset 2 from the angle 2 calculated by the angle 2 calculating unit 117 are input to the subtraction amount calculating unit 115.

Next, a description will be given of calculation processing performed by the subtraction amount calculating unit 115. FIG. 3 illustrates signal variation in the units 111 to 117 shown in FIG. 2 when an angular velocity caused by hand shake is input thereto. In FIG. 3A, an angular velocity output 301 of the angular velocity sensor 103 and an offset value 302 of the angular velocity calculated by the offset 1 calculating unit 111 are shown. A signal of the angle calculated by integrating the angular velocity output 301 is a signal 308 shown in FIG. 3F. An offset value 307 of the angle is also shown in FIG. 3F.

When a large angular velocity occurs in a panning operation, the output (the signal 308) of the angle calculating filter strays far away from the offset value 307, and then is converged to the offset value 307 for a period of time. When the calculated angle significantly deviates from the offset value, a long period of time is required until the signal 308 returns to close to the offset value 307, so that image shake correction cannot be performed. In particular, when the frequency band of image shake correction control is expanded to a lower frequency side, that is, when the cut-off frequency of the angle calculating filter is set to low, a time during which an image shake correction performance is degraded becomes longer. Thus, when the angular velocity is large, a signal from which an unnecessary angular velocity component, not to be corrected has been cut off as much as possible, is input to the angle calculating filter. The output of the angle calculating filter can be preferably controlled within a certain angle range centered at the angle offset value, resulting in an improvement in image shake correction performance immediately after panning.

Accordingly, in the present embodiment, an angular velocity subtraction amount is calculated by using an angle signal (previous sampling value of the angle 2), which is an image shake correction target value, the angular velocity subtraction amount is subtracted from an angular velocity, and then the resulting signal is integrated. In this manner, an image shake correction target value can be calculated, while limiting the movable range of the correction member. Thus, even when a large shake occurs in a panning operation, image shake correction can be executed immediately after panning.

The subtraction amount calculating unit 115 calculates an angular velocity subtraction amount from the following values.

An angular velocity 303 (see FIG. 3B) after offset removal, which is obtained by subtracting the offset value 302 from the angular velocity output 301 in FIG. 3A.

An angle signal 309 (see FIG. 3D) after offset removal, which is obtained by subtracting the offset value 307 from the previous sampling value of the angle 2.

A gain calculation table shown in FIGS. 3G and 3H.

In FIG. 3G, the angle signal 309 after offset removal is plotted on the horizontal axis and the gain coefficient α is plotted on the vertical axis. The angle signal 309 after offset removal is compared with a threshold value. When the angle signal 309 after offset removal is equal to or less than the first threshold value A1, the value of the gain coefficient α is 0. When the angle signal 309 after offset removal is equal to or greater than the second threshold value A2, the value of the gain coefficient α is 1. When the angle signal 309 after offset removal lies between the threshold values A1 and A2, the gain coefficient α is a value derived by linear interpolation between 0 and 1.

In FIG. 3H, the angle signal 309 after offset removal is plotted on the horizontal axis and the gain coefficient β is plotted on the vertical axis. When the angle signal 309 after offset removal is equal to or greater than the third threshold value B1, the value of the gain coefficient β is 0. When the angle signal 309 after offset removal is equal to or less than the fourth threshold value B2, the value of the gain coefficient β is 1. When the angle signal 309 after offset removal lies between the threshold values B1 and B2, the gain coefficient β is a value derived by linear interpolation between 0 and 1.

The subtraction amount calculating unit 115 calculates an angular velocity subtraction amount from the gain coefficients α and β, and the angular velocity 303 after offset removal. The angular velocity subtraction amount is calculated by the following formulae (2) and (3), but a gain coefficient varies depending on the sign of the angular velocity 303 after offset subtraction. In other words, when the sign of the angular velocity 303 after offset subtraction is positive, the gain coefficient α is multiplied by the angular velocity, whereas when the sign of the angular velocity 303 after offset subtraction is negative, the gain coefficient β is multiplied by the angular velocity.

[Formula 2]
When the angular velocity is positive, $$\text{Angular velocity subtraction amount} = \text{angular velocity after offset subtraction} \times \alpha \quad (2)$$

[Formula 3]
When the angular velocity is negative, $$\text{Angular velocity subtraction amount} = \text{angular velocity after offset subtraction} \times \beta \quad (3)$$

A signal 304 shown in FIG. 3C is a signal obtained by further subtracting the angular velocity subtraction amount from the angular velocity 303 after offset subtraction. A signal 305 shown in FIG. 3E is a signal obtained by subtracting the angular velocity subtraction amount from the angular velocity output 301. A signal 306 shown in FIG. 3F is a signal of the angle calculated by integrating the signal 305. When a large shake occurs in a panning operation, the angular velocity component due to the influence may be cut off under the above control. Consequently, the convergence time taken until the control becomes stable immediately after panning becomes shorter, so that appropriate shake correction may be performed.

Next, a description will be given of a control effect according to the present embodiment, with reference to FIGS. 4A and 4B. FIG. 4A illustrates a waveform 401 of the shake angle of an imaging apparatus. In this case, it is preferable that the target angle of image shake correction is the same as that of the waveform 401. In practice, however, the correctable range of an image shake correcting apparatus is limited, an offset is included in the output of the shake detecting unit, and the offset drifts with temperature. Thus, it is difficult to execute image shake correction in accordance with the waveform 401.

FIG. 4B illustrates an angle offset 404 generated by passing the angular velocity offset of the shake detecting unit (the angular velocity sensor 103) through an integrating filter. It is preferable that the target image shake correction angle is controlled by taking the angle offset 404 as a center. When the angular velocity subtraction processing described with reference to FIGS. 2 and 3 is not performed, an image shake correction angle 402 strays far away from the angle offset 404 during a panning operation, so that a long period of time is required until the image shake correction angle 402 returns again to the offset. As the cut-off frequency of the filter is set to a lower frequency side, a longer amount of time is taken for recovery. During the time period until the image shake correction angle 402 returns to the angle offset 404, the image shake correction angle 402 deviates from the waveform 401 indicating the actual camera shake angle, so that the appropriate correction effect cannot be obtained. Hence, the angular velocity subtraction processing described with reference to FIGS. 2 and 3 is performed, so that the image shake correction angle can be determined, as shown in an angle 403 by taking the angle offset 404 as a center. Thus, an amount of control (correction angle) that is similar to the ideal shake target value (the waveform 401) can be calculated, so that appropriate image shake correction may be performed.

The angle can be calculated without using the HPF 109 under the above control. However, the calculated angle includes an offset under the influence of the output noise component of the angular velocity sensor 103. Hereafter, a description will be given of how image shake correction is controlled based on the output of the angle 2 calculating unit 117 with an offset included therein.

FIG. 5 illustrates signal waveforms for explaining shake correction amount calculation processing during imaging, and at the periods other than the imaging period. A waveform 501 indicates the angle 2 calculated by the angle 2 calculating unit 117. A waveform 502 indicates the angle 1 calculated by the angle 1 calculating unit 110. Since the HPF 109 is not used for calculating the angle 2, the influence of a temperature drift appears if a long period of time elapses after the power is turned on. For example, a temperature drift of the offset of the angular velocity sensor 103 occurs in a period 504, so that the angle 2 away from a zero center is calculated.

Figure 6:
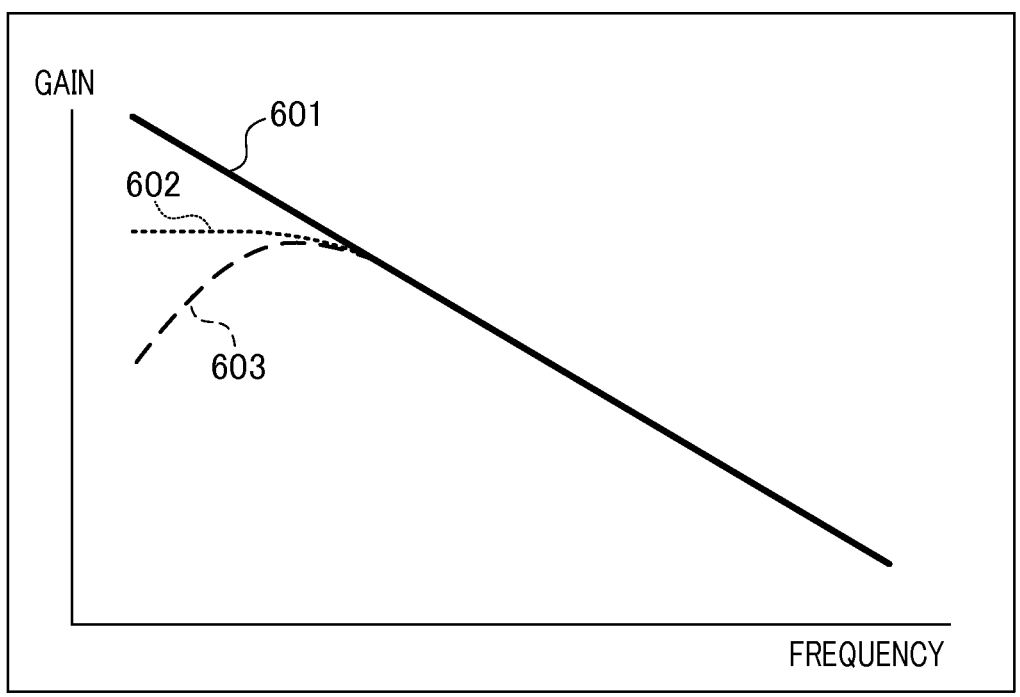
FIG. 6 is an explanatory diagram illustrating the gain characteristic of a filter according to the first embodiment of the present invention.

FIG. 6 illustrates the frequency-gain characteristic of an angle calculating filter. A graph line 601 indicates the filter characteristic of pure integration and corresponds to 1/s on the left side of Formula (1). A graph line 602 indicates the filter characteristic of an angle calculating filter, i.e., the filter characteristic of integration and HPF indicated by Formula (1). The graph line 602 indicates a flat characteristic in a low frequency band, and the gain characteristic for the angular velocity offset remains in the angle output. Thus, as the angular velocity offset increases by the influence of the temperature drift of the angular velocity sensor 103 in the period 504 shown in FIG. 5, the angle 2 indicated by the waveform 501 gradually deviates from the zero center.

The angle 1 is the output of the angle 1 calculating unit 110 shown in FIG. 2 and is a signal to be calculated by using both the integrating filter (integration and HPF) and the HPF 109. Thus, a filter characteristic in which the characteristic of the HPF 109 is added to the characteristic indicated by the graph line 602 exhibits a decrease in gain in a low frequency range, as shown by a graph line 603. In other words, an offset component included in the output of the angular velocity sensor 103 can be removed, so that the angle is calculated at the zero center. Note that, since the characteristic of the HPF 109 is taken into account, the image shake correction effect immediately after a large shake caused by a panning operation, or the like, is weakened due to a swing-back phenomenon.

Thus, more appropriate image shake correction is performed by using the waveform 501, instead of the waveform 502 shown in FIG. 5. The waveform 501, however, exhibits the filter characteristic as shown in the graph line 602 in FIG. 6, i.e., the waveform 501 exhibits a flat gain characteristic in which the gain is not attenuated in a low frequency range. Angle calculation is performed with the output of the angular velocity sensor including an angular velocity offset component. Thus, when image shake correction is always performed by using the waveform 501, the offset included in the waveform 501 increases due to a temperature drift of an angular velocity offset component. The movable range of the correction member becomes insufficient as time elapses, so that the correction member becomes uncontrollable at its movable end. In the present embodiment, it is determined whether or not the imaging is in progress, and a signal indicated by a waveform 503 is used in the imaging period. A signal indicated by the waveform 502 is used in the preparation period (during EVF is being displayed, during an AF (auto-focusing)/AE (auto-exposure) operation, or the like) prior to imaging. In this manner, the image shake correction effect is improved in the imaging period due to a filter characteristic expanded to a low frequency range. The image shake correction effect can be ensured to a certain extent in the period other than the imaging period, the precision of AF/AE control, the easiness of a framing operation by a photographer, and the like, are improved.

In FIG. 5, a time 505 indicates the timing of start of imaging, and a time 506 indicates the timing of end of imaging. If control is made in accordance with the angle target position shown in the waveform 502 in the imaging period from the time 505 to the time 506, a swing-back may occur by the influence of the HPF 109 immediately after panning. In this case, control is made in a state different from the actual hand shake, resulting in a reduction in the image shake correction effect. In the present embodiment, a difference between the waveform 501 and the waveform 502 at the time 505 is calculated as an offset, and the offset is subtracted from the waveform 501. The waveform 503 indicates a temporal variation of a signal after offset subtraction. A signal indicated by the waveform 503 is used in the imaging period. Upon completion of imaging at the time 506, a signal is added to the signal indicated by the waveform 503 such that the waveform 503 returns to the waveform 502 at a constant speed. Finally, the waveform 503 coincides with the waveform 502.

As described above, image shake correction is executed based on the angle calculated by a filter configuration without including the HPF 109 in the imaging period. Thus, the filter characteristic can be expanded to a low frequency range without a swing-back phenomenon immediately after panning or tilting, resulting in an increase in the image shake correction effect.

Next, a description will be given of signal processing performed by the reference value calculating unit 121 and the signal selecting unit 122, and the effect obtained thereby. The reference value calculating unit 121 shown in FIG. 2 calculates the offset reference value for the output of the angular velocity sensor 103. Offset calculation processing starts after the power is turned on so as to calculate an offset reference value. Then, upon completion of reference value calculation processing performed by the reference value calculating unit 121, the offset reference value is output as a fixed value to the subtracting unit 116. The offset reference value is initialized when the power to the angular velocity sensor 103 is turned OFF, and calculation of the offset reference value is started when the power to the angular velocity sensor 103 is turned ON. While offset reference value calculation processing is not completed, a reference value calculation completion notification is not input to the signal selecting unit 122. Upon completion of offset reference value calculation processing, the reference value calculating unit 121 notifies the signal selecting unit 122 of the completion of reference value calculation. While reference value calculation is not completed, the signal selecting unit 122 selects the output value of the HPF 109 and sends it to the angle 2 calculating unit 117. Upon completion of reference value calculation processing, the signal selecting unit 122 selects the output value of the subtracting unit 116, and sends it to the angle 2 calculating unit 117.

The reference value calculating unit 121 may also determine the offset reference value for the output of the angular velocity sensor 103 using the same method as the offset calculating method performed by the offset 1 calculating unit 111. The offset 1 calculating unit 111 calculates an angular velocity offset component (the offset 1), which is included in the output of the angular velocity sensor 103 as detection noise. For example, the output value of the angular velocity sensor 103, when the amplitude of the angular velocity passed through the HPF or the amplitude of angular acceleration obtained by differentiating the angular velocity is less than a predetermined threshold value, is acquired. These output values are smoothly connected by an LPF, of which the cut-off frequency is set to very low, so that the angular velocity offset which is a DC component, is calculated. At this time, the threshold value is set to low during the time period until the first offset calculation is performed, i.e., during the time period until an offset reference value is calculated, whereas the threshold value is set to higher than that prior to reference value calculation after the offset reference value is calculated. In this manner, the calculation precision of the first offset reference value can be improved, so that offset calculation by the offset 1 calculating unit 111 is readily updated. The reference value calculating unit 121 holds the calculated offset reference value during the time period until the power to the angular velocity sensor 103 is in the OFF state.

Figure 7:
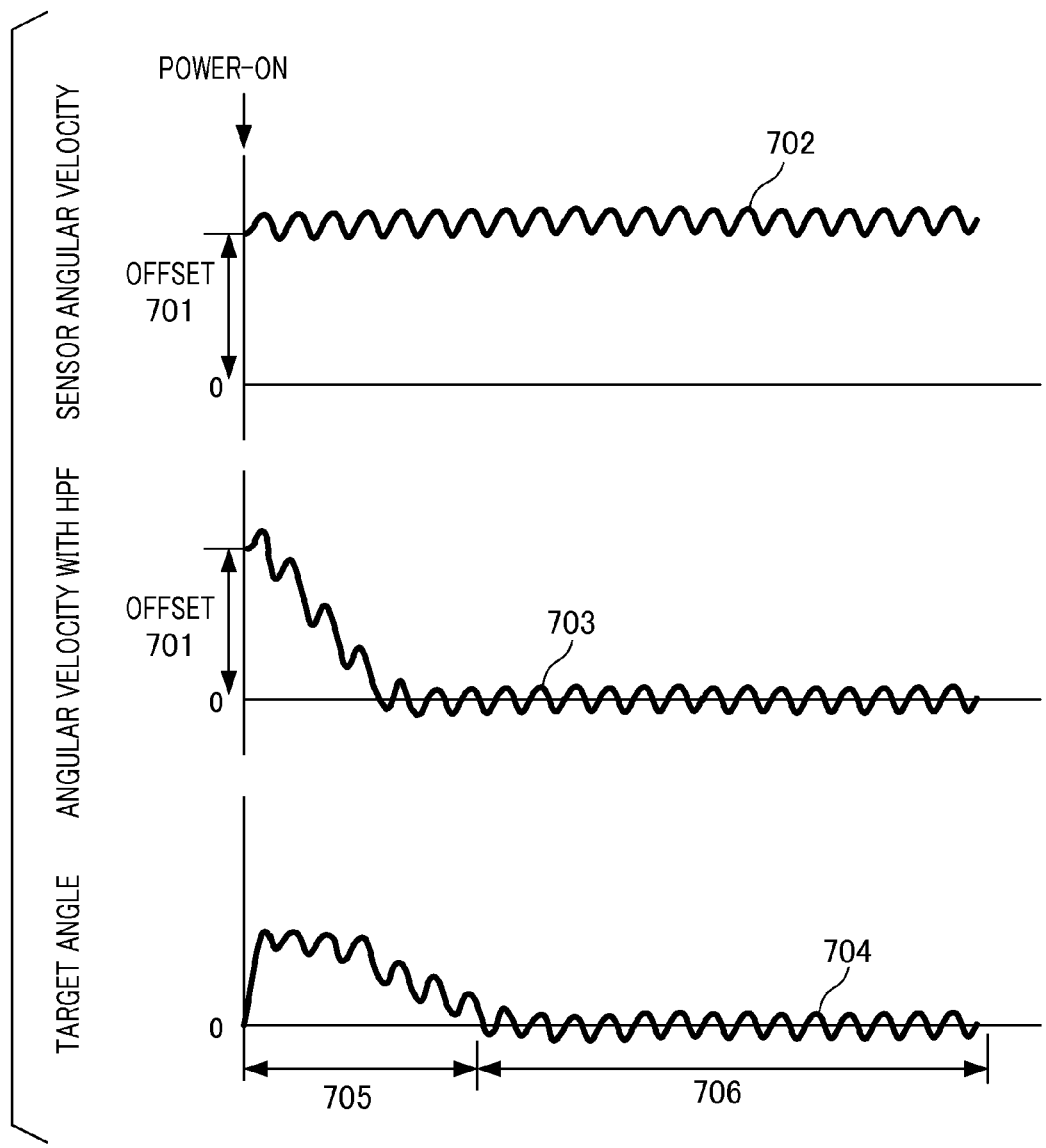
FIG. 7 is a diagram illustrating a target angle calculated by an angle 1 calculating unit 110 after the low frequency component is cut off.

Next, a description will be given of an image shake correction effect according to the present embodiment, with reference to FIGS. 7 to 9. FIG. 7 illustrates a target angle calculated by the angle 1 calculating unit 110 after the low frequency component is cut off by the HPF 109, because an offset 701 is included in the output of the angular velocity sensor 103 when the power is turned on. The output 702 of the angular velocity sensor 103 is a signal obtained by adding the offset 701 serving as sensor noise to the angular velocity caused by hand shake, or the like. When a low frequency component is cut off by passing the output of the angular velocity sensor 103 through the HPF 109, the offset 701 is removed, as shown by a signal 703. The target angle calculated by the angle 1 calculating unit 110, using the output of the HPF 109, is shown in a signal 704. Angle calculation is in an unstable state by the influence of the offset 701 in a period 705 from a time point when the power is turned on. Then, the target angle is calculated with the effect of the offset 701 removed in a period 706 after the elapse of a certain time. However, since the HPF 109 is used, the image shake correction performance is particularly degraded in a low frequency range of a cut-off frequency or less. If the cut-off frequency of the HPF 109 is set to low, the image shake correction effect in a low frequency range in the period 706 increases. However, the period 705 required until control becomes stable after the power is turned on becomes longer. In contrast, if the cut-off frequency of the HPF 109 is set to high, the period 705 becomes shorter, resulting in shortening of the time required until control becomes stable after the power is turned on. However, the image shake correction effect in a low frequency range in the period 706 is weakened.

Figure 8:
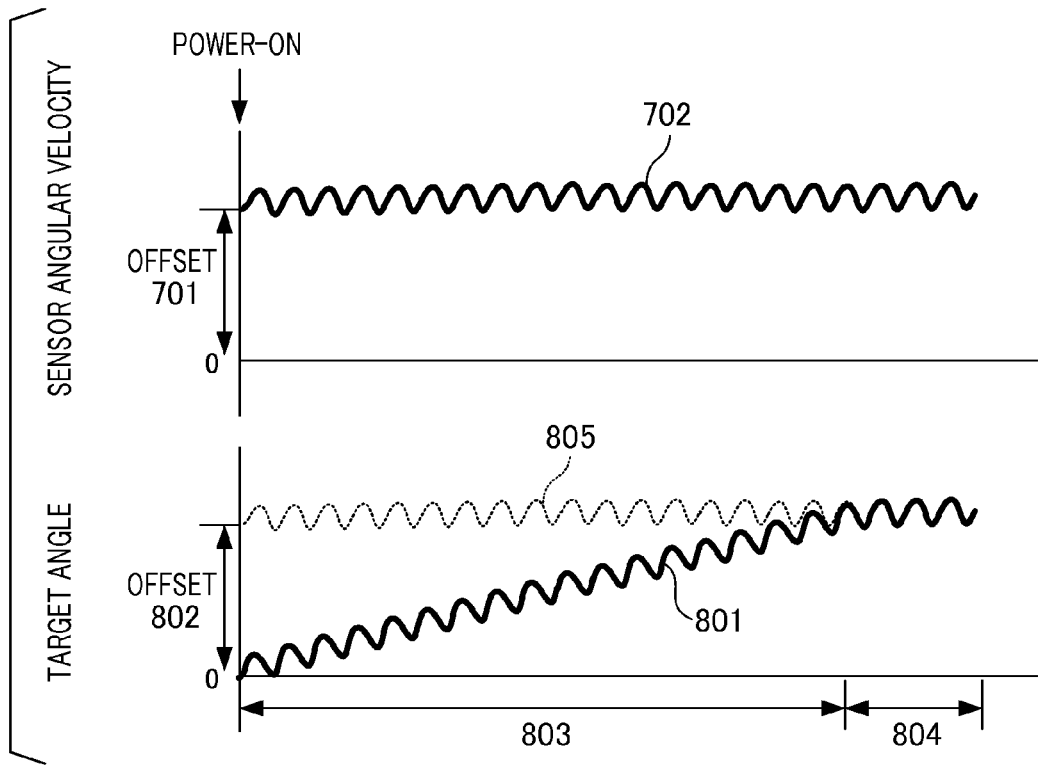
FIG. 8 is a diagram illustrating a target angle obtained when no processing is performed by a reference value calculating unit 121 and a signal selecting unit 122.

FIG. 8 illustrates a target angle when the offset 701 is included in the output of the angular velocity sensor 103, when the power is turned on, but no processing is performed by the reference value calculating unit 121 and the signal selecting unit 122. The target angle is calculated by integrating a signal, which is obtained by subtracting only the output of the subtraction amount calculating unit 115 from the output of the angular velocity sensor 103 by the subtracting unit 116, by the angle 2 calculating unit 117.

The output 702 of the angular velocity sensor 103 with the offset 701 included therein is passed through the angle 2 calculating unit 117 without HPF processing and offset subtraction so as to calculate a target angle 801. The filter exhibits a flat characteristic in a low frequency band, as shown by the graph line 602 in FIG. 6. Thus, the gain characteristic of the angular velocity offset component remains in the angle output, so that the target angle is calculated with an offset 802 included therein. However, the initial value of the target angle at a time point when the power is turned on is zero. Since filter calculation is performed for the output 702 of the angular velocity immediately after the power is turned on, a time indicated by a period 803 is required until the target angle 801 reaches an angle signal 805 including an angle offset. If the cut-off frequency of the filter is low, the length of the period 803 becomes longer, whereas if the cut-off frequency of the filter is high, the length of the period 803 becomes shorter. Note that the cut-off frequency of the filter needs to be set to a relatively low value in a period 804 in order to ensure an image shake correction performance in a low frequency range.

In the present embodiment, instead of passing the output of the angular velocity sensor 103 directly through the filter, filter calculation starts after the offset 701 is calculated and, then, an offset reference value is subtracted from the output 702 of the angular velocity sensor. In this manner, the length of the period 803 can be shortened.

Figure 9:
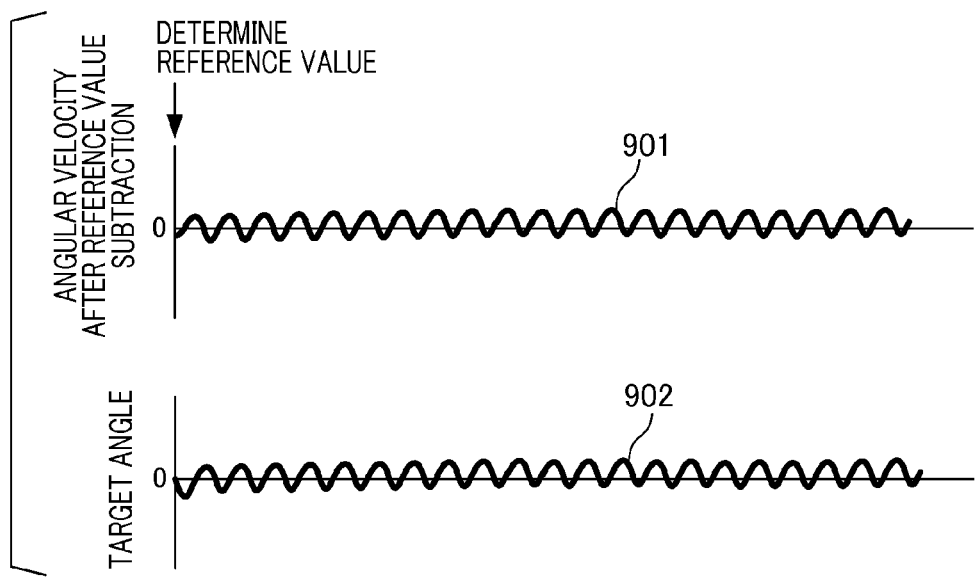
FIG. 9 is a diagram illustrating a target angle obtained by angle calculation processing according to the first embodiment of the present invention.

FIG. 9 shows exemplary calculation of a target angle. The reference value calculating unit 121 and the signal selecting unit 122 perform signal processing, the subtracting unit 116 subtracts the output of the subtraction amount calculating unit 115 and the output of the reference value calculating unit 121 from the output of the angular velocity sensor 103, and then, the angle 2 calculating unit 117 integrates the resulting output, so that the target angle is calculated. A signal 901 indicates an angular velocity obtained by subtracting an offset reference value from the output 702 of the angular velocity sensor. The signal 901 is passed through the filter of the angle 2 calculating unit 117 so as to calculate a target angle 902. The unstable period as shown by the period 803 in FIG. 8 is mostly eliminated in the target angle 902. Even if an error occurs in calculation of an offset reference value, there is no unstable state for a long period of time, such as the period 803, so that control becomes stable for a very short period of time.

In the above processing, the offset reference value for the output 702 of the angular velocity sensor 103 (see FIG. 8) needs to be calculated. The reference value calculating unit 121 shown in FIG. 2 calculates the offset reference value. As described above, the offset reference value is calculated by acquiring the output value of the angular velocity sensor 103 when the amplitude of the angular velocity passed through the HPF or the amplitude of angular acceleration obtained by differentiating the angular velocity is less than a predetermined threshold value. In other words, an initial offset is calculated based on the output value of the angular velocity sensor 103 when a vibration applied to a camera is very small. It is difficult, however, to determine an offset immediately after the power is turned on. The reason for this is because there is an unstable period due to the initialization operation of the angular velocity sensor 103 immediately after the power is turned on, and thus, a signal output from the angular velocity sensor 103 is unstable. In addition, it is difficult to calculate an offset when a large vibration is continuously applied to a camera after the power is turned on.

In the method for calculating a target angle after subtraction of an offset reference value from an angular velocity, control based on the target angle (the calculation result) cannot be performed unless the offset reference value is calculated. Hence, in the present embodiment, the target angle signal 704 (see FIG. 7) is calculated by passing a signal, from which an offset has been removed by the HPF 109, through an integrating filter during the time period until an offset reference value is calculated, so that image shake correction is performed. After calculation of the offset reference value, the offset reference value calculated by the reference value calculating unit 121 is subtracted from the output of the angular velocity sensor 103 without passing through the HPF 109. The subtracted signal is passed through the integrating filter, so that image shake correction is performed based on the calculated target angle 902 (see FIG. 9).

In this manner, a filter in which the control band is expanded to a lower frequency side is used without using the HPF 109 after calculation of an initial offset (reference value), resulting in an improvement in the correction effect. The HPF 109 is used prior to calculation of an offset reference value, so that an image shake correction performance can be ensured, to some extent, while shortening the time required until control becomes stable immediately after the power is turned on.

As described above, the reference value calculating unit 121 initializes the offset reference value when the power to the angular velocity sensor 103 is turned OFF, and starts calculation of the offset reference value again when the power to the angular velocity sensor 103 is turned ON. Even when the angular velocity sensor 103 is transitioned to sleep (pause) mode, the offset reference value is initialized, and calculation of the offset reference value is started again upon release of the sleep mode. The reason for this will be described below.

Assume the case when an offset deviates from the one set immediately prior to setting the sleep mode due to a drift in the angular velocity sensor offset associated with a change in temperature after being transitioned to the sleep mode. At the moment of release of the sleep mode, the offset 1 calculated by the offset 1 calculating unit 111 and the offset 2 calculated by the offset 2 calculating unit 113 may significantly deviate from an offset to be actually set. In this case, if a long time is required until control becomes stable immediately after release of the sleep mode, an appropriate image shake correction effect may not be obtained during that time. Thus, the offset reference value is initialized, even when the angular velocity sensor 103 is transitioned to sleep mode. Alternatively, the time from the transition to sleep mode is measured and, then, the offset reference value is initialized if a measurement time exceeds a predetermined determination time. A predetermined determination time is set to a time during which no significant change in temperature drift occurs. The temperature may be measured by a thermistor mounted close to a gyro sensor (posture detecting unit) within a camera so as to acquire a temperature upon transition to sleep mode, so that the offset reference value may be initialized when a change in temperature greater than a predetermined value is detected. In this case, when a change in temperature is less than a predetermined value, a value (amount of change in temperature), which does not cause a significant change in temperature drift change, is set as a threshold value.

Figure 10:
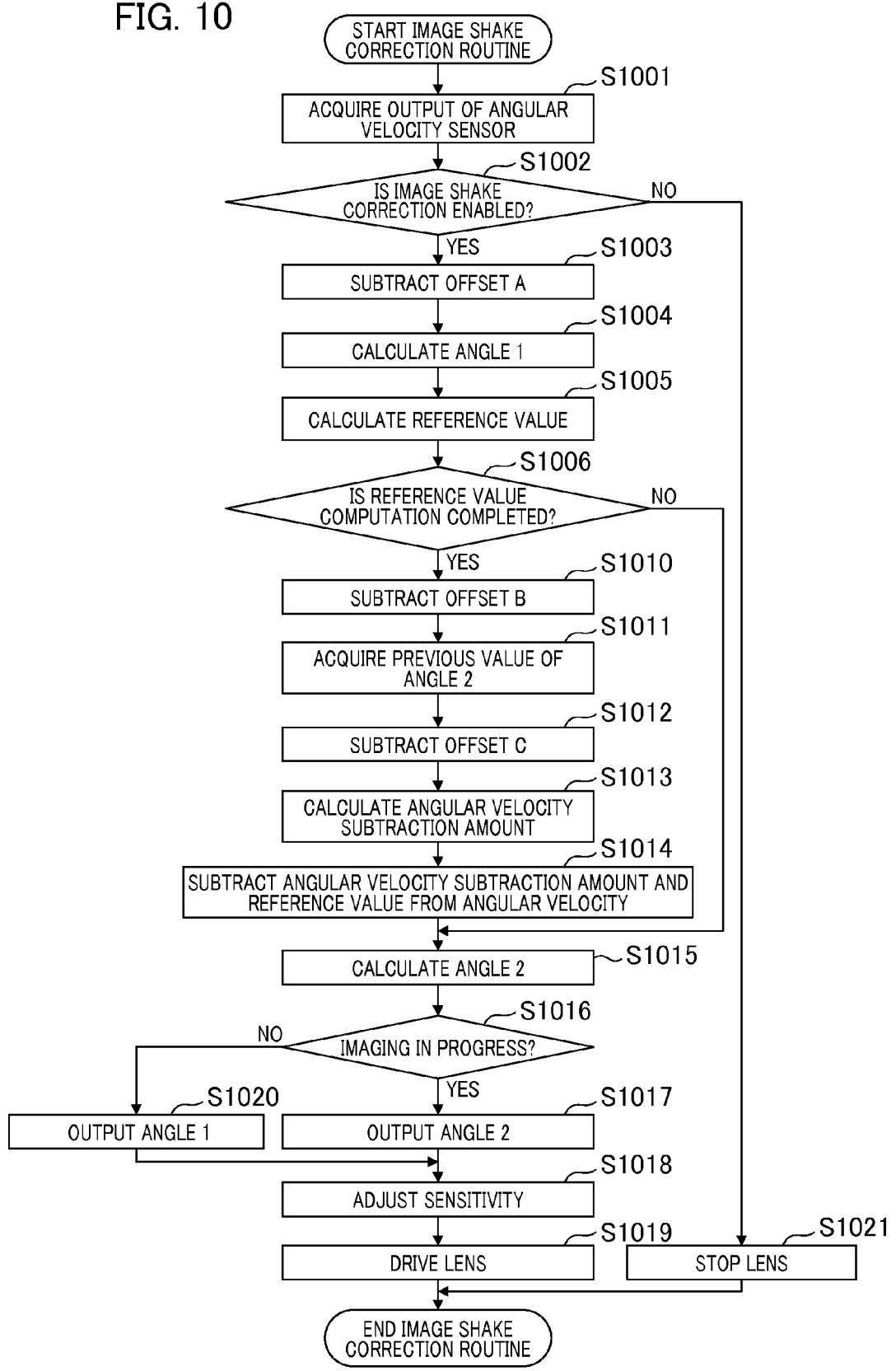
FIG. 10 is a flowchart illustrating image shake correction according to the first embodiment of the present invention.

Next, a description will be given of the image shake correction operation of the present embodiment, with reference to the flowchart shown in FIG. 10. The processing shown in FIG. 10 starts when the main power supply to a camera is turned ON, and is executed by the CPU 105 for each predetermined sampling cycle.

First, in step S1001, the CPU 105 acquires the output of the angular velocity sensor 103. In step S1002, the CPU 105 determines whether or not image shake correction is enabled. If image shake correction is enabled, the process advances to step S1003, whereas if shake correction is disabled, the process advances to step S1021. The determination processing in step S1002 determines that image shake correction is disabled, during the time period until the output of the angular velocity sensor 103 becomes stable, after the power is turned on. After the output of the angular velocity sensor 103 becomes stable, the determination processing in step S1002 determines that image shake correction is enabled. In this manner, the image shake correction performance caused by performing image shake correction in a state when the output value of the angular velocity sensor 103, immediately after the power is turned on is unstable, may be prevented from being degraded. In step S1003, the HPF 109 subtracts an offset (denoted as "A") from an angular velocity output so as to output the subtracted angular velocity. In step S1004, the angle 1 calculating unit 110 integrates the angular velocity from which the offset A is subtracted so as to calculate the angle 1.

In step S1005, the reference value calculating unit 121 calculates a reference value (offset reference value), which is the initial offset of the angular velocity sensor 103. When the reference value can be calculated, the reference value is calculated, so that reference value calculation is completed. Once the reference value is calculated, the reference value is held during the time period until the power to the angular velocity sensor 103 is turned OFF. When the reference value is not yet calculated in step S1005, after the power to the angular velocity sensor 103 is turned ON, reference value calculation is not completed. It is determined in step S1006 whether or not reference value calculation is completed. When reference value calculation is completed, the process advances to step S1010, whereas, when reference value calculation is not completed, the process advances to step S1015. In step S1015, the angle 2 calculating unit 117 integrates the angular velocity from which the offset A calculated in step S1003 is subtracted, so as to calculate the angle 2.

In step S1010, the offset 1 calculating unit 111 calculates an angular velocity offset (denoted as "B"), and then the subtracting unit 112 subtracts the offset B from the angular velocity, so as to output the subtracted angular velocity. In step S1011, the output of the angle 2 calculating unit 117 (previous sampling value) is acquired. In step S1012, the offset 2 calculating unit 113 calculates an offset (denoted as "C") from the angle 2 acquired in step S1011. The subtracting unit 114 subtracts the offset C from the angle 2, so as to output the subtracted angle.

In step S1013, the subtraction amount calculating unit 115 calculates an angular velocity subtraction amount from the angular velocity, from which the offset B calculated in step S1010 is subtracted, and the angle from which the offset C calculated in step S1012 is subtracted. Next, in step S1014, the subtracting unit 116 subtracts the angular velocity subtraction amount and the reference value from the angular velocity prior to offset subtraction. In step S1015, the angle 2 calculating unit 117 integrates a signal obtained by subtracting the angular velocity subtraction amount and the reference value from the angular velocity so as to calculate the angle 2.

In step S1016, the signal switching unit 118 determines whether or not the imaging is in progress based on the output value of the release SW 104. If the imaging is not in progress, the process shifts to step S1020, and the angle 1 is set as the target angle. Then, the process advances to step S1018. On the other hand, if it is determined in step S1016 that the imaging is in progress, the process shifts to step S1017, and the angle 2 is set so that the target angle indicated by the waveform 503 described with reference to FIG. 5 is set. In step S1018, the sensitivity adjusting unit 119 multiplies the target angle by the sensitivity, based on a focal distance and a shooting magnification obtained by the positional information 107 about the zoom lens and the focus lens, so as to calculate an image shake correction target value. In step S1019, the drive control unit 120 drives the correction lens based on the image shake correction target value. Then, an image shake correction subroutine ends, and the processing is pending until the next sampling time. When the process shifts to step S1021, the drive control unit 120 stops driving of the correction lens and ends the image shake correction subroutine, so that the processing is pending until the next sampling time.

In the present embodiment, an offset reference value, which is a noise offset component of the angular velocity sensor 103, is calculated after the power is turned on. Prior to calculation of the offset reference value, the angular velocity output obtained after HPF processing (after removal of offset component) is integrated, so as to calculate a target angle, so that a shake correction amount is calculated. After calculation of the offset reference value, a signal obtained by subtracting the offset reference value from the output of the angular velocity sensor 103 is integrated, so as to calculate a target angle, so that a shake correction amount is calculated. Thus, a filter, in which the control band is expanded to a lower frequency side, is used without using the HPF 109, after calculation of an offset reference value, resulting in an improvement in the image shake correction effect. The HPF 109 is used prior to calculation of an offset reference value, so that an image shake correction performance can be ensured, to some extent, while shortening the time required until control becomes stable immediately after the power is turned on.

According to the present embodiment, image shake correction in a wide frequency band may be realized under the control, while ensuring a stable image shake correction performance immediately after a start of a shake detection operation after power-on.

Second Embodiment

Figure 11:
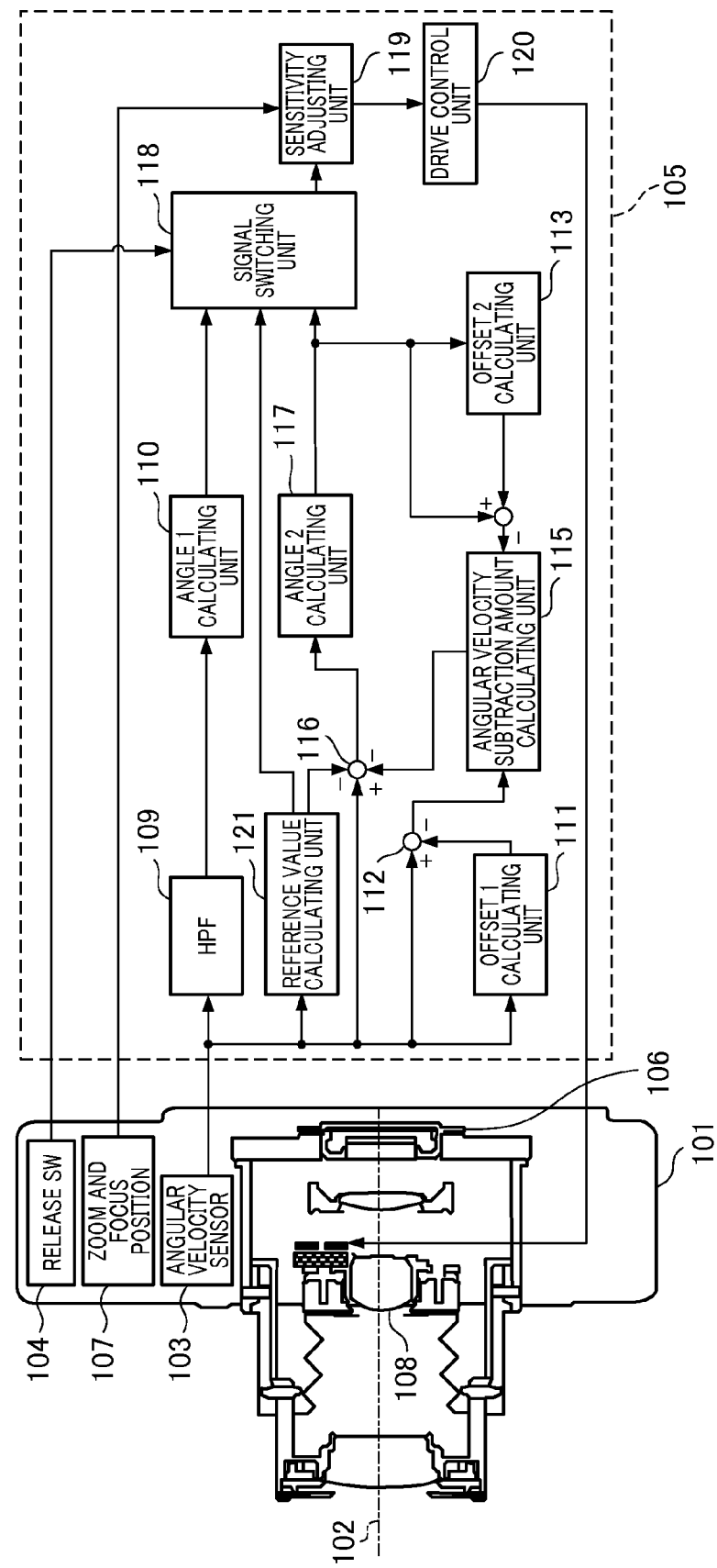
FIG. 11 is a top view and a control block diagram illustrating an imaging apparatus according to a second embodiment of the present invention.

Next, a description will be given of a second embodiment of the present invention. In the present embodiment, the same elements as those in the first embodiment are designated by the same reference numerals, and a detailed explanation thereof will be omitted. A description will be given mainly of the differences from the first embodiment. The differences in configuration between FIG. 11 and FIG. 2 are as follows:

In FIG. 11, no signal selecting unit 122 is provided, so that a reference value calculation completion notification from the reference value calculating unit 121 is input to the signal switching unit 118.

The signal switching unit 118 determines whether or not the imaging operation has started, based on the open/close signal of the release SW 104. The signal switching unit 118 selects either the angle 1 or the angle 2, depending on the determination result, so as to execute image shake correction by using the selected angle. In the present embodiment, the signal switching unit 118 selects either the angle 1 or the angle 2, with reference to the reference value calculation completion notification from the reference value calculating unit 121. Specifically, when the signal switching unit 118 determines that the imaging operation has started, based on the open/close signal of the release SW 104, and acquires the reference value calculation completion notification from the reference value calculating unit 121, the signal switching unit 118 selects the angle 2. When the signal switching unit 118 determines that the imaging operation has not started, and does not acquire the reference value calculation completion notification from the reference value calculating unit 121, the signal switching unit 118 selects the angle 1. For example, when no reference value calculation completion notification is provided from the reference value calculating unit 121 at a time point when the power is turned on, the angle 1 is selected. In this manner, image shake correction is performed in accordance with the target angle calculated by passing a signal, from which an offset has been removed by the HPF 109, through an integrating filter during the time period until an offset reference value is calculated. After calculation of the offset reference value, image shake correction is performed in accordance with the target angle calculated by passing a signal, which is obtained by subtracting the offset reference value calculated by the reference value calculating unit 121 from the output of the angular velocity sensor 103, through an integrating filter, without passing through the HPF 109.

According to the present embodiment, image shake correction in a wide frequency band may be realized, while simplifying a circuit configuration, and ensuring a stable image shake correction performance immediately after a start of a shake detection operation after power-on.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image shake correcting apparatus comprising:
   (a) a shake detecting unit configured to detect shake and to produce a shake detection signal;
   (b) a calculating unit configured to calculate an image shake correction amount by acquiring the shake detection signal output from the shake detecting unit; and
   (c) a shake correcting unit configured to correct an image shake in accordance with the image shake correction amount calculated by the calculating unit,
   wherein the calculating unit comprises:
      (i) an offset removing unit configured to remove an offset component from the shake detection signal using a high-pass filter; and
      (ii) a reference value calculating unit configured to calculate an offset reference value by acquiring the shake detection signal,
   wherein the calculating unit causes the offset removing unit to remove an offset component from the shake detection signal to thereby calculate the image shake correction amount from a start of an operation of the shake detecting unit until the reference value calculating unit calculates the offset reference value regarding the shake detection signal, and the calculating unit calculates the image shake correction amount from a signal obtained by subtracting the offset reference value from the shake detection signal after the reference value calculating unit calculates the offset reference value, and
   wherein the image shake correction amount from the signal obtained by subtracting the offset reference value from the shake detection signal does not pass by the high-pass filter.

2. The image shake correcting apparatus according to claim 1, wherein the calculating unit causes the offset removing unit to remove the offset component from the shake detection signal to thereby calculate the image shake correction amount from a time when power is supplied to the shake detecting unit until the reference value calculating unit calculates the offset reference value regarding the shake detection signal.

3. The image shake correcting apparatus according to claim 2, wherein the reference value calculating unit initializes the offset reference value in accordance with one of (i) a stoppage of the power supply to the shake detecting unit and (ii) a transition to a sleep mode.

4. The image shake correcting apparatus according to claim 1, wherein the calculating unit causes the offset removing unit to remove the offset component from the shake detection signal to thereby calculate the image shake correction amount from a time when a sleep mode of the shake detecting unit is canceled until the reference value calculating unit calculates the offset reference value regarding the shake detection signal.

5. The image shake correcting apparatus according to claim 1, wherein the calculating unit further comprises:
    (iii) a first calculating unit configured to calculate a first image shake correction amount by acquiring the shake detection signal;
    (iv) a second calculating unit configured to calculate a second image shake correction amount by acquiring the shake detection signal; and
    (v) a switching unit configured to perform switching between the first image shake correction amount and the second image shake correction amount,
    wherein image shake correction is performed based on one of (i) the first image shake correction amount and (ii) the second image shake correction amount.

6. The image shake correcting apparatus according to claim 5,
    wherein the first calculating unit calculates the first image shake correction amount from a signal obtained by removing an offset component from the shake detection signal by the offset removing unit, and
    wherein the second calculating unit calculates the second image shake correction amount from the signal obtained by removing an offset component from the shake detection signal by the offset removing unit from the start of the operation of the shake detecting unit until the reference value calculating unit calculates the offset reference value, and the second calculating unit calculates the second image shake correction amount from a signal obtained by subtracting the offset reference value from the shake detection signal after the reference value calculating unit calculates the offset reference value.

7. An imaging apparatus comprising:
    the image shake correcting apparatus according to claim 5,
    wherein the switching unit selects the second image shake correction amount during an imaging period and the switching unit selects the first image shake correction amount prior to imaging so that the shake correcting unit performs image shake correction.

8. A lens barrel comprising:
    the image shake correcting apparatus according to claim 1.

9. An imaging apparatus comprising:
    the lens barrel according to claim 8.

10. An optical apparatus comprising:
    the image shake correcting apparatus according to claim 1.

11. A control method to be executed by an image shake correcting apparatus that comprises a shake detecting unit configured to detect shake and to produce a shake detection signal, a calculating unit configured to calculate an image shake correction amount by acquiring the shake detection signal output from the shake detecting unit, and a shake correcting unit configured to correct an image shake in accordance with the image shake correction amount calculated by the calculating unit, the method comprising:
    calculating, by the calculating unit, the image shake correction amount by removing an offset component from the shake detection signal using a high-pass filter from a start of the operation of the shake detecting unit until an offset reference value regarding the shake detection signal is calculated; and
    calculating, by the calculating unit, the image shake correction amount from a signal obtained by subtracting the offset reference value from the shake detection signal after the offset reference value is calculated,
    wherein the image shake correction amount from the signal obtained by subtracting the offset reference value from the shake detection signal does not pass by the high-pass filter.

* * * * *